US006784837B2

(12) United States Patent
Revankar et al.

(10) Patent No.: US 6,784,837 B2
(45) Date of Patent: Aug. 31, 2004

(54) TRANSMIT/RECEIVER MODULE FOR ACTIVE PHASED ARRAY ANTENNA

(75) Inventors: Udayshankar Kashinathrao Revankar, Bangalore (IN); Kalappurakkal Thomas Sophy, deceased, late of Bangalore (IN); by Sonia Poulose, legal heir, Kerala (IN); Kilari Sreenivasulu, Bangalore (IN); Kori Malleshappa Veerabhadra, Bangalore (IN)

(73) Assignee: Chief Controller, Research and Development Ministry of Defence, Government of India, New Dehli (IN)

( * ) Notice: Subject to any disclaimer, the term of this patent is extended or adjusted under 35 U.S.C. 154(b) by 0 days.

(21) Appl. No.: 10/240,822

(22) PCT Filed: Apr. 9, 2001

(86) PCT No.: PCT/IN01/00088

§ 371 (c)(1),
(2), (4) Date: Apr. 2, 2003

(87) PCT Pub. No.: WO01/77706

PCT Pub. Date: Oct. 18, 2001

(65) Prior Publication Data

US 2003/0156060 A1 Aug. 21, 2003

(30) Foreign Application Priority Data

Apr. 7, 2000 (IN) .................................... 415/DEL/2000

(51) Int. Cl.[7] .......................... H01Q 3/22; H01Q 3/24; H01Q 3/26
(52) U.S. Cl. ...................... 342/372; 342/157; 342/173
(58) Field of Search ................................. 342/372, 173, 342/157, 175

(56) References Cited

U.S. PATENT DOCUMENTS 5,412,414 A * 5/1995 Ast et al. ..................... 342/174
5,745,076 A * 4/1998 Turlington et al. ......... 342/372
6,114,986 A * 9/2000 Cassen et al. .............. 342/175

* cited by examiner

Primary Examiner—Theodore M. Blum
(74) Attorney, Agent, or Firm—Venable LLP; Catherine M. Voorhees (57) ABSTRACT

This invention relates to a transmit/receive module for a high power Active Phased Array Antenna system operating in L-band based upon a combination of Hybrid Microwave Integrated Circuit (MIC) as well as Monolithic Microwave Integrated Circuit (MMIC) technology. The transmit/receive module includes a power monitoring means, transmitter protector means, and a receiver protector means. The module comprises a signal transmit chain incorporating power conditioner and a signal receive chain incorporating control electronics and bias- sequencer modulator. The transmit chain has switching means for switching the module to transmit mode which is connected to the transmit amplifier chain through a shared digital phase shifter. The amplified signals from the transmit amplifier chain are conveyed to a duplexer means. In receive mode, the receive chain receives signal through drop-in circulator and high power switch and comprises of high power limiter, low noise amplifier means, and a digital attenuator means connected to the shared digital phase shifter through T/R switch means. Electronic means are connected through integrated control electronic., bias sequencer modulator and power conditioner for controlling the operation of the device.

13 Claims, 6 Drawing Sheets

TRANSMIT/RECEIVER MODULE FOR ACTIVE PHASED ARRAY ANTENNA

FIELD OF INVENTION

This invention relates to a Transmit/Receive Module for Active Phased Array Antennas and more specifically to a Transmit/Receive module for L-Band Active Phased Array Antennas/Apertures which are employed in long range Active Phased Array Radars.

PRIOR ART

A Radar based on Active Phased Array Antenna System basically includes a plurality of active radiating antenna elements each of which is driven by/drives an individual Transmit/Receive module located closely adjacent thereto. Active Phased Arrays or Active Aperture Arrays, are being utilised in modern day Radar Systems. The active Array architecture overcomes the major Passive Array problems viz, low reliability inherent with tube type Radar Transmitters and their attendant high voltage power supplies and modulation, and the losses presented by their reciprocal ferrite/PIN diode phase shifters with the associated Passive Array RF manifold. Active Phased Arrays use individual solid-state T/R microwave module element at each of its radiating element (antenna), thus avoiding the distribution and phase shifter losses encountered in the Passive Array design. For the same radiated power, Active Phased Array Systems have been found to be significantly efficient, smaller and lighter than the conventional Passive Array systems. Need to generate very large power to obtain large power aperture product for long-range surveillance can be satisfied only with Active Phased Array Systems utilising Active Aperture Array techniques.

The performance of modern radar systems with Active Phased Array Antennas is mainly driven by the performance of the Transmit/Receive modules utilised in the system. As mentioned above, A Radar System with Active Phased Array Antenna may utilise a large number of Transmit/Receive modules, each connected to individual radiating elements (antenna) of the Active Array. In fact, the key element of the Active Phase Phased Array is the Transmit/Receive microwave module whose performance decides the overall performance of the Radar. A long range Radar working in L-band (1.2–1.4 GHz) may typically employ 200 individual Transmit/Receive modules. The performance of Radar system with Active Phase Phased Array Antenna is critically dependent on the availability of compact and minimum weight, low consumption and high reliability microwave Transmit/Receive modules. The major functions of a Transmit/Receive module are the generation of the transmit power, the low noise amplification of the received signals coupled to and received from the respective radiating element, the phase shift in the transmit and receive mode for beam steering, and the variable gain setting for aperture weighting during reception. The Transmit/Receive module architecture is closely related to the functionality required in the Active Apertures of the Array in which it is used.

Parameters that determine T/R module architecture are: (1) the need for a high transmit power with maximized power added efficiency, (2) the need to maximize receive input $3^{rd}$ order intercept with a low front-end noise figure, (3) the need for self-calibration and built-in test capability in the module, (4) the need for low array sidelobes on receive mode, (5) the need for a distributed beam steering computation, and (6) the need for an effective heat transfer with a low module weight and cost.

The Transmit/receive modules utilised in Active Phased array Antennas are known in the art. However, these Transmit/Receive modules, known in the art suffer from following disadvantages.

Primary disadvantage of Transmit/Receive modules, known in the art, is that these are realized through Microwave Integrated Circuit (MIC) architecture thereby making the size of the T/R module bulky.

Another disadvantage of Transmit/Receive modules, known in the art, is that reliability of these T/R modules is less because of large number of interconnects therein.

Yet another disadvantage of Transmit/Receive modules, known in the art, is that their repeatability characteristics for phase and amplitude over all the Transmit/Receive Modules is very low.

Still further disadvantage of Transmit/Receive modules, known in the art, is that their phase and amplitude setting accuracy is inferior.

Yet another disadvantage of Transmit/Receive modules, known in the art, is that these are not cost effective.

OBJECTS OF THE INVENTION

Primary object of the present invention is to provide a Transmit/Receive (T/R) module which is realized through hybrid architecture of Microwave Integrated Circuit (MIC) and Monolithic Microwave Integrated Circuit (MMIC) both thereby helping In miniaturizing the complete T/R module.

Another object of the present invention is to provide a Transmit/Receive module in which the transmit chain is realised through MIC architecture thus enabling it to handle high level of output power necessary for long range radars.

Yet another object of the present invention is to provide a Transmit/Receive module in which the receive chain is realised through MMIC architecture thus helping in miniaturizing the receiver module.

Yet further object of the present invention is to provide a Transmit/Receive Module in which the transmit chain can provide high peak and average power output thereby enhancing the range capability of the Radar.

Still another object of the present invention is to provide a Transmit/Receive module in which high cooling efficiency is realised utilising cold plate with embedded microchannels underneath each of the power devices in Transmit Module.

Still further object of the present invention is to provide a Transmit/Receive module, which is capable of operating in entire L-band Radar frequency.

Still another object of the present invention is to provide a Transmit/Receive module, which has a low noise figure and a linear gain.

Yet another object of the present invention is to provide a Transmit/Receive module which is highly reliable with high repeatable performance in the entire L-band.

Still another object of the present invention is to provide a Transmit/Receive module, which has a very close phase and amplitude level match for all the individual T/R Modules.

Still further object of the present invention is to provide a Transmit/Receive module, which is highly compact and cost effective.

Still another object of the present invention is to provide a Transmit/Receive module which has a self-calibrating and built-in test facility.

Yet another object of the present invention is to provide a Transmit/Receive module which has a distributed beam steering computation facility.

Still another object of the present invention is to provide a Transmit/Receive module, which has a low front-end noise figure.

Still further of the present invention is to provide Transmit/Receive module which has a capability of controlling transmit power output fee realizing low side lobes for transmit radiation pattern.

STATEMENT OF INVENTION

According to this Invention there is provided a transmit/receive module for a high power active phased array antenna system operating in L-baud based upon a combination of hybrid microwave Integrated circuit (MIC) and monolithic microwave Integrated circuit (MMIC) technology and having power monitoring means (22–25) for on line diagnostic purposes, a transmitter protector means and u receiver protector means, the said transmit/receive module comprising:

signal transmit chain (10) Incorporating power conditioner (33), and signal receive chain (11) incorporating control electronics (37) and bias sequence-modulator (39); wherein, the said signal transmit chain (10) comprises of:

T/P switching means (35), for switching the module to the transmit mode, connected to the transmit amplifier chain (12–20) through shared 6-bit digital phase shifter (36); duplexer means (21) receiving the, amplified signal from the transmit amplifier chain (12–20) sad forming the said transmitter protector means of the said transmit chain (10); a high power switch (23) having a drop in circulator (27) connected to its input end which together with a high power limiter (29) of the said receive, chain (11) form the said receiver protector means of the said receive chain (11) in no power monitoring means (22–25); a Single Pole Single Throw (SPST) switch (26) for on line sampling of transmit power; Tx/Rx Interface PCBs (40,41) for interconnections between the said transmit chain (10) and the said receive chain (11); wherein, the said receive chain (11) receives signal from drop-in circulator (27) and high power switch (28) in receive mode and comprises of: high power limiter (29); RF pre-selection filter (30) connected to the said high power limiter (29); low noise amplifier means (31–33); 6-bit digital attenuator means (34) connected to shared digital phase shifter (36) through T/R switching means (35); all connected through control electronics (37), bias sequencer-modulator (39) and power conditioner means (38).

In accordance with the present invention, the improved Transmit/Receive module for Active Phased Array Antenna elements operating in L-band is realized through hybrid architecture employing both Microwave Integrated Circuit (MIC) as well as Monolithic Microwave Integrated Circuit (MMIC). The use of MIC components in transmit chain of the module helped in generating high power output necessary for long ranging while incorporation of MMIC technology in receive chain of the module helps in miniaturizing the same thus reducing the size of the complete Transmit/Receive module. The proposed Transmit/Receive module can operate in entire L-band providing high peak and average power output with a very high degree of reliability and repeatability. The module is able to provide very close amplitude and phase level matching and tracking for the Transmit/Receive Modules. The Transmit Chain of the module is designed to generate a high peak power output, with a large pulse width and duty over the large RF bandwidth, using Silicon (Si) bipolar transistors operating in efficient class 'C' mode. Low Noise Amplifier (LNA), Digital Attenuator and Shared Phase Shifter with T/R switches in the Receive Chain of the T/R module, use GaAs (Gallium Arsenide) MMICs for a reliable cost effective solution. Si PIN diodes having high breakdown voltage are used for realizing Receiver Protector Circuitry. The module has an integral on-mounted driver/control circuitry using a microcontroller and miniature hybrid packaging employing SMDs (Surface Mount Devices). The Transmit and Receive Chains are configured using microstrip circuitry on two soft ceramic microwave laminates, which are stacked compactly in a signal T/R module housing. The transmit circuit laminate is screwed on to the integrated liquid cooled cold plate of the module housing, which provides the best cooling efficiency by utilising microchannel cooling underneath each of the power devices of the Transmit Chain. The overall module size is compact and fits in a triangular array grid.

Any further characteristics, advantages and applications of the invention will become evident from the detailed description of the preferred embodiment which has been described and illustrated with the help of following drawings wherein,

BRIEF DESCRIPTION OF THE DRAWINGS

Referring to FIG. 1, Indicating the general working of a T/r module, T/R switch 03 is shown in the transmit mode of operation. During the transmit mode of Radar, a pulsed RF signal (Radar Exciter Output) is supplied to the module from the array manifold. This signal is phase.

DESCRIPTION OF THE INVENTION

Figure 1:
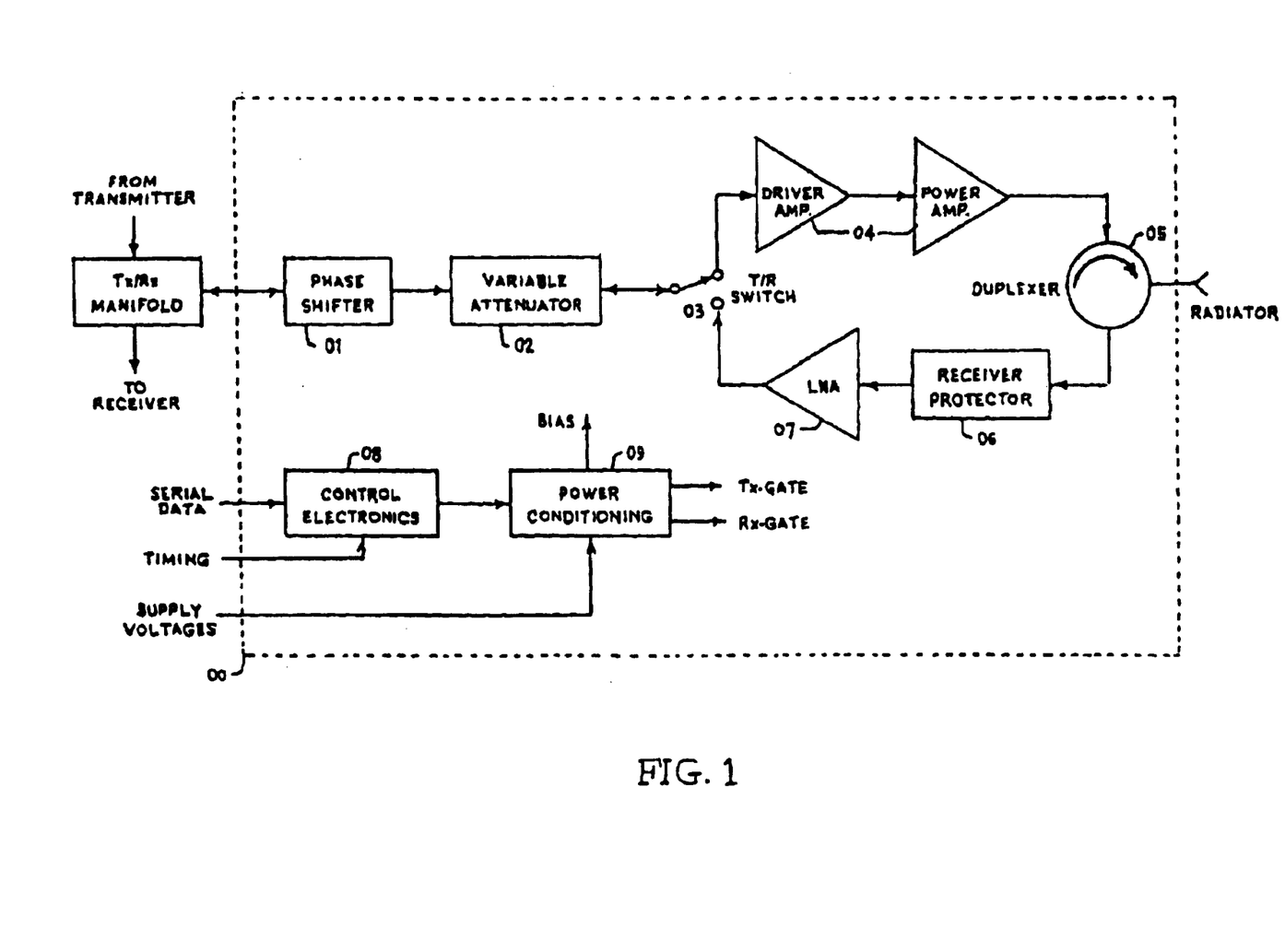
FIG. 1 is an electrical block diagram illustrative of the Transmit/Receive module.

Referring to FIG. 1, T/R switch 03 is shown in the transmit mode of operation. During the transmit mode of Radar, a pulsed RF signal (Radar Exciter Output) is supplied to the module from the array manifold. This signal is phase Shifted in a digital phase shifter 01 and amplitude adjusted in digital attenuator 02 at each of the module site to produce the desired radiation beam. The signal is then amplified by transmit driver and final amplifiers 04, and routed through the circulator-duplexer 05 to the radiating element. In the receive mode, Radar return signals are routed back through the duplexer 05, the receiver protector 06 and the low noise amplifier 07 which largely establishes the system noise figure. The amplified return signal is amplitude adjusted and phase shifted in the same digital attenuator 02 and phase shifter 01 respectively and routed to the array manifold.

The amplitude weighting (through the digitally controlled attenuator 02) on the transmit and receive mode is used for synthesizing the low sidelobe pattern of the array both during transmit and receive modes. Thus, during transmit, the receive amplifier 07 output is turned off and during receive, the transmit amplifier input is turned off by the SPDT T/R switch 03. The Radar dead time is utilized for changing the phase and attenuator values and for switching channel select T/R switch 03. The control electronics 08 serves to interface the module to the array controllers, providing beam steering and timing information needed by the module. The power-conditioning block 09 provides the necessary sequential biases and switching commands for the respective module components.

DESCRIPTION OF THE INVENTION

Figure 2:
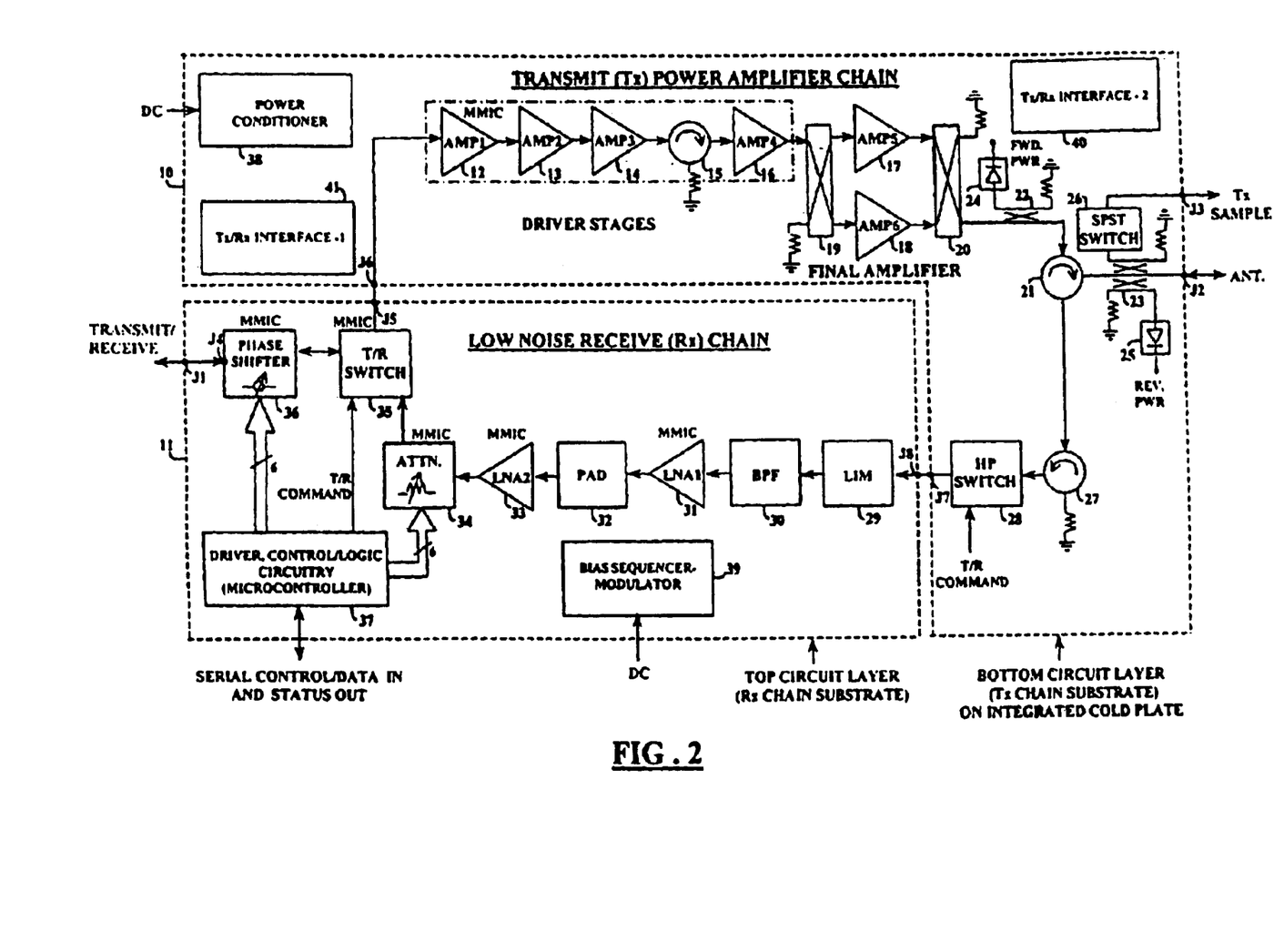
FIG. 2 is a detailed electrical block diagram illustrative or the preferred embodiment of the present invention.

Referring to FIG. 2, the Transmit Power Amplifier Chain of the T/R module operates in saturated mode using multi-stage transmit amplifier 12–18 based on four stage class 'C' amplification 13–18 with a GaAs MMIC Medium Power Amplifier (WA) as the input driver 12. Silicon Bipolar transistors are used in the class 'C' Transmit Chain. The Final Power Amplifier Chain utilizes balanced stage 17–18 with wire-line hybrid divider 19/combiner 20, driven by power output generated by the Driver Amplifier Chain 12–16. The Final Power Amplifier develops an output power of +57 dBm (peak) minimum, at 10% duty with a transmit pulse width capability of 100 $\mu$sec over the complete L-band Radar frequency. The DC power required is derived from on-mounted adjustable voltage regulators from the Power Conditioner 38 and would be used for transmit power control, for amplitude weighting of the array in the transmit mode to realise low sidelobe patterns. A smooth amplitude taper across the array could be realised by employing proper control/adjustment of the DC supplies from the power conditioner, to different stages of the Transmit Chain.

A microstrip coupler 22 with a detector 24 cum matching circuitry at the transmit amplifier output provides a power monitor. A drop-in circulator 21 used at the power amplifier output acts as a high power T/R duplexer for a good input VSWR and non-reciprocal characteristics, handling peak power in excess of +58 dBm. Also, there is a provision of reflected power monitoring for diagnostics, through an asymmetric coupler 23 and detector 25 in addition to the transmit power sample through SPST switch 26 for any on-line testing to be performed. The complete Transmit Chain is configured using microstrip circuitry on thin soft ceramic microwave laminate with aluminium back-up for ease of circuit fabrication, machining, as well as, connector-less drop-in packaging FIG. 2 illustrates the Transmit Chain Substrate 10.

The Receive Chain of the T/R module employs MMIC technology. The GaAs MMICs used are packaged surface mount type. Two front-end Low Noise Amplifiers (LNAs) 31 and 33, each with 1.8 dB Noise Figure, 25 dB Gain and $P_{out}$ (1 dB) of +14 dBm, are employed in cascade prior to a digitally controlled attenuator 34. An adjustable attenuator pad 32 is placed in between the two LNAs to control the overall receive gain of the T/R module and also to optimize the saturation level of the overall front-end low noise amplification. The 6-Bit MMIC attenuator 34 provides maximum of 31.5-dB attenuation with a resolution of 0.5 dB. The shared MMIC Phase Shifter 36 uses a 6-Bit control with an LSB of 5.625°. The T/R channel select switch 35 is also based on the MMIC technology, offering a minimum of 40 dB isolation.

The receiver protector function in the T/R module is realised by a high power switch 28 and limiter 29 combination. Another drop-in circulator 27 configured as an isolator, at the input of the high power switch 28, forms a part of the receiver protector. This also offers a good match for the Transmit Power Amplifier output during transmit period, by making the high power reflecting type of switch 28 to act as an absorptive one. The high power switch 28 employs shunt mounted high voltage PIN diodes and operates on T/R switching command during transmit period and is designed to handle the required high peak and average power experienced when the antenna port of T/R module is, by mistake, disconnected from the antenna array element. Hence, the high power switch 28 and the isolator 27 are mounted on the Transmit Chain substrate 10 itself for proper heat transfer and cooling. The high power limiter 29 also utilises high breakdown voltage PIN diodes and meets with identical high power handling requirements, so that, in case of non-operation of the high power switch 28, LNAs 31 and 33 are protected from any high power output reflection from the antenna port by limiting the reflected power to a limited threshold with a good spike suppression.

RF pre-selection filtering at the front-end of the Receive Chain of the T/R module is realised by a low loss MIC dropin bandpass filter 30. This filter is realised on a temperature stable ceramic substrate and offers a very low insertion loss over the RF pass band with a good skirt response. Similar to the Transmit Chain, the Receive chain circuitry is also laid out on another thin soft ceramic microwave laminate with aluminium backup.

The driver and control/logic circuitry 37 is also mounted on the same substrate forming part of the receive circuitry. This employs a microcontroller for computation and providing the necessary 6-bit beam steering commands and amplitude excitation respectively to the phase shifter 36 and attenuator 34, as required for the respective radiating element connected to the module, based on the phase and amplitude gradients in X and Y-direction, and address identity required on a serial link from the main Beam Steering Controller of the array. The microcontroller also stores the phase and amplitude errors generated by calibration and applies them to realise respective element excitations for synthesising low sidelobe patterns through the array scan angles. The T/R switch commands for the two switches 35 and 28 are also generated in the microcontroller 37. The on-line diagnostics of module power supplies and forward/reverse sample power outputs obtained from the detectors 24/25, is also performed in the microcontroller card 37, providing ultimately as a 'status out' from the module. In addition, the Receive Chain circuitry also houses a bias sequencer-modulator circuit 39 for proper sequencing the gate and drain supplies to the MMICs 31, 33, 34–36 and MPA 12 and providing the drain pulse drive required for the MIPA 12 during the T/R transmit period, so as to conserve the average power drawn/dissipated by the MPA 12. This circuit 39 employs opto-couplers for fast switching and controlled delays, with current drivers used for the MMIC drain supplies. An additional MOSFET switching circuit is employed to generate drain pulse drive required for the MPA 12. Both the microcontroller card 37 and the bias sequencer-modulator circuit 39 are realised using all surface mount custom silicon ICs and components mounted on miniature size multilayer PCBs.

The Transmit Chain houses two Tx/Rx interface PCBs 40 and 41 for interconnecting to the module DC/Signal input connectors 50/JI 42 and the Receive Chain circuitry on the top layer, through the two functional PCBs in the Receive Chain, viz., microcontroller card 37 and bias sequencer-modulator card 39. The final transmit power output to the antenna element and the transmit sample power for monitoring/calibration are taken out through the RF connectors J2 43 and J3 44 respectively.

Figure 3:
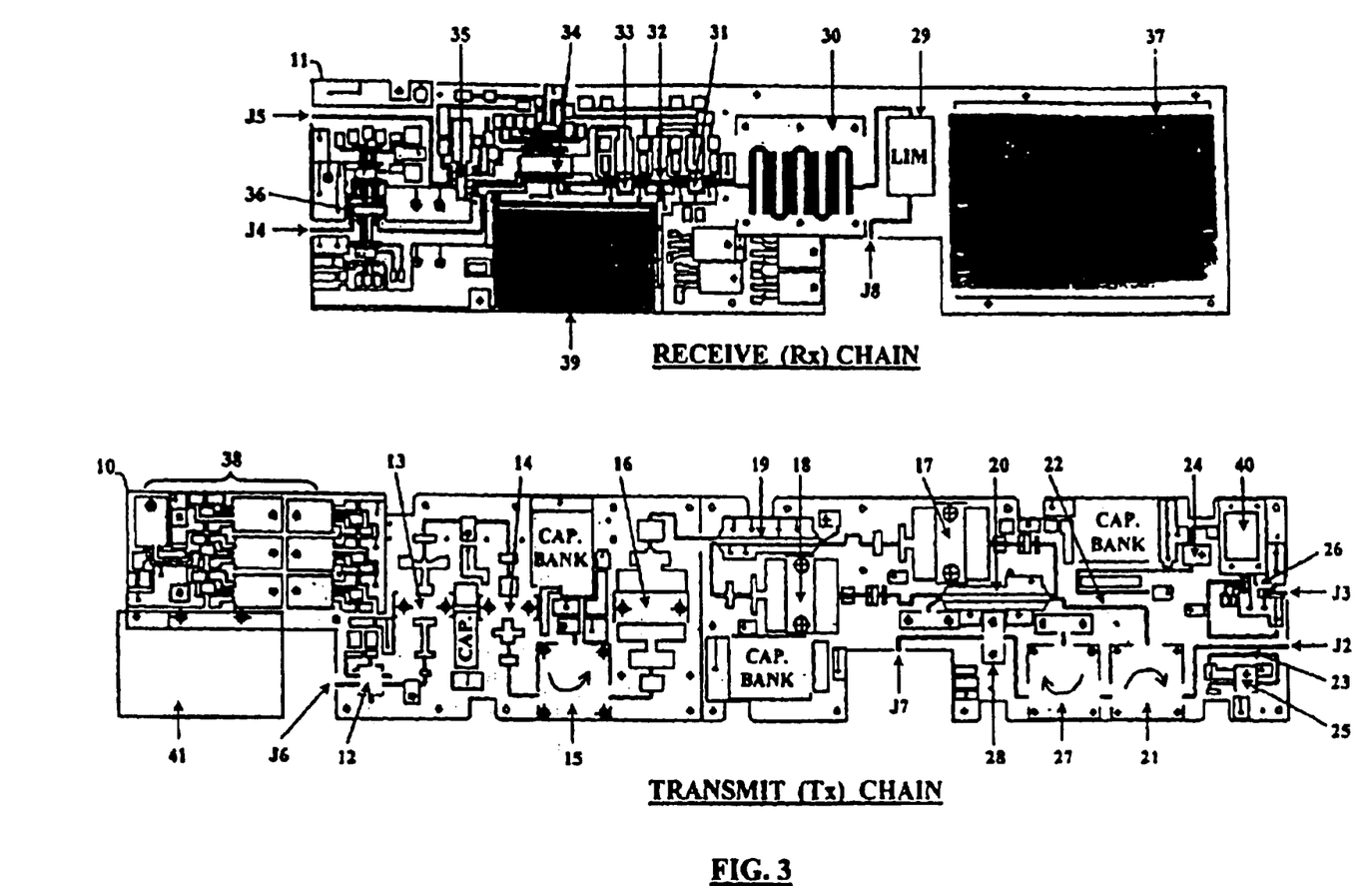
FIG. 3 is a diagram illustrative of the two stacked layers of the T/R module with the detail, on the microstrip and digital circuit layouts.

Referring to FIG. 3, the Transmit and Receive Chains 10 and 11 of the T/R module are realised on two different soft ceramic (high dielectric constant) microwave laminates. Three short low loss RF cable assemblies (J1 42-34 45, 35 46-J6 47 and 37 48-38 49) connect the RF ports between the Transmit and Receive Substrates and to the Tx In/Rx Out connector J1 42.

Figure 4:
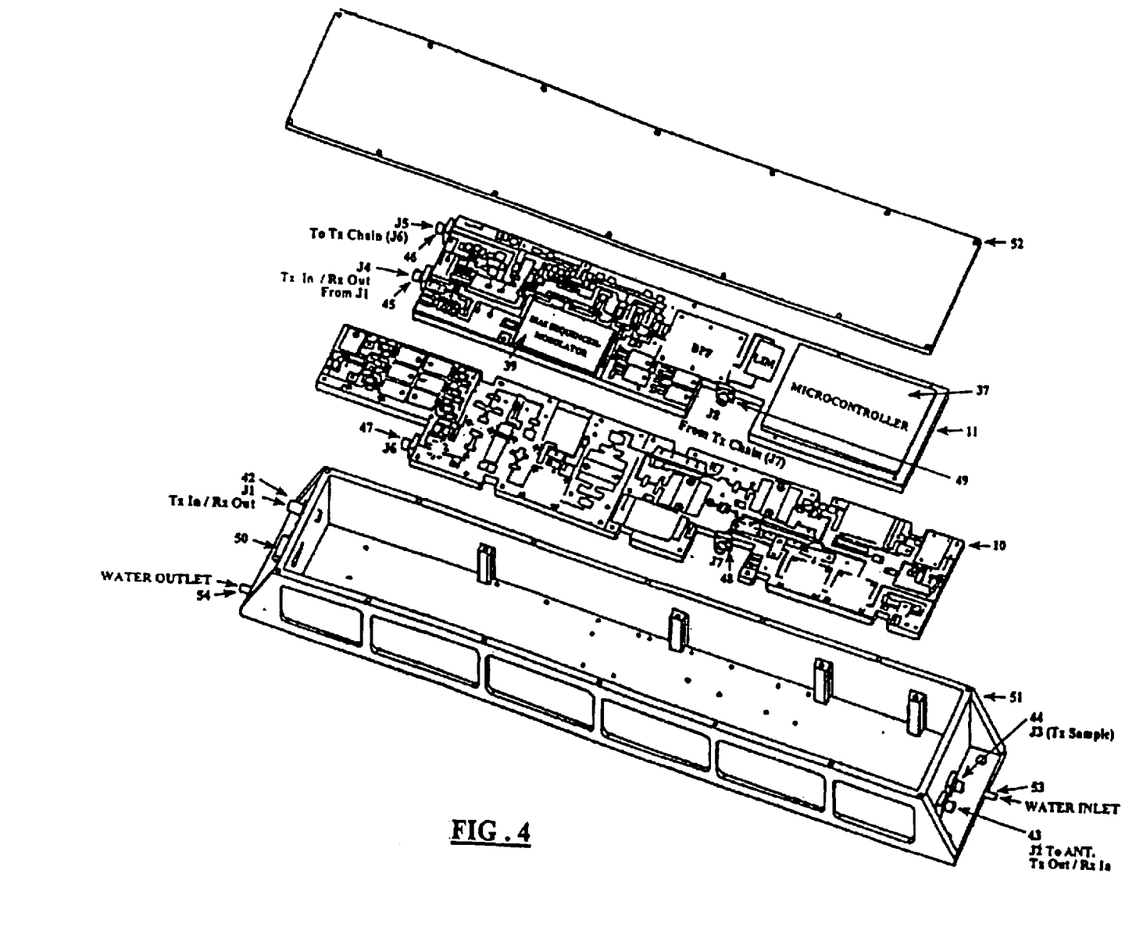
FIG. 4 is an exploded perspective view of the T/R module components, vix., Module Housing, the Transmit and Receive Chain substrates and the Interconnections between them and with the Module connectors.

Referring to FIG. 4, the size of the T/R module housing is made compact with lateral dimensions exactly fitting the triangular array grid in L-band Radar frequency. Transmit and Receive channel circuitries are laid out in the stacked two-layer configuration in a compact T/R module housing 51 with the top cover 52. The transmit circuit laminate 10 is the lower one and thus is made to have a good thermal contact with the floor of the housing. The bottom of the housing is made as an integrated liquid cooled cold plate with water inlet 53 and outlet 54 entries lengthwise on either side of the module housing. The transmit circuitry is screwed on to this integrated cold plate floor. When the module operates in its full duty of 10% the Transmit Chain of the module is required to dissipate around 120 W of heat and the cold plate design caters for this by use of microchannels embedded underneath each of the high power devices of the Transmit Chain.

Figure 5:
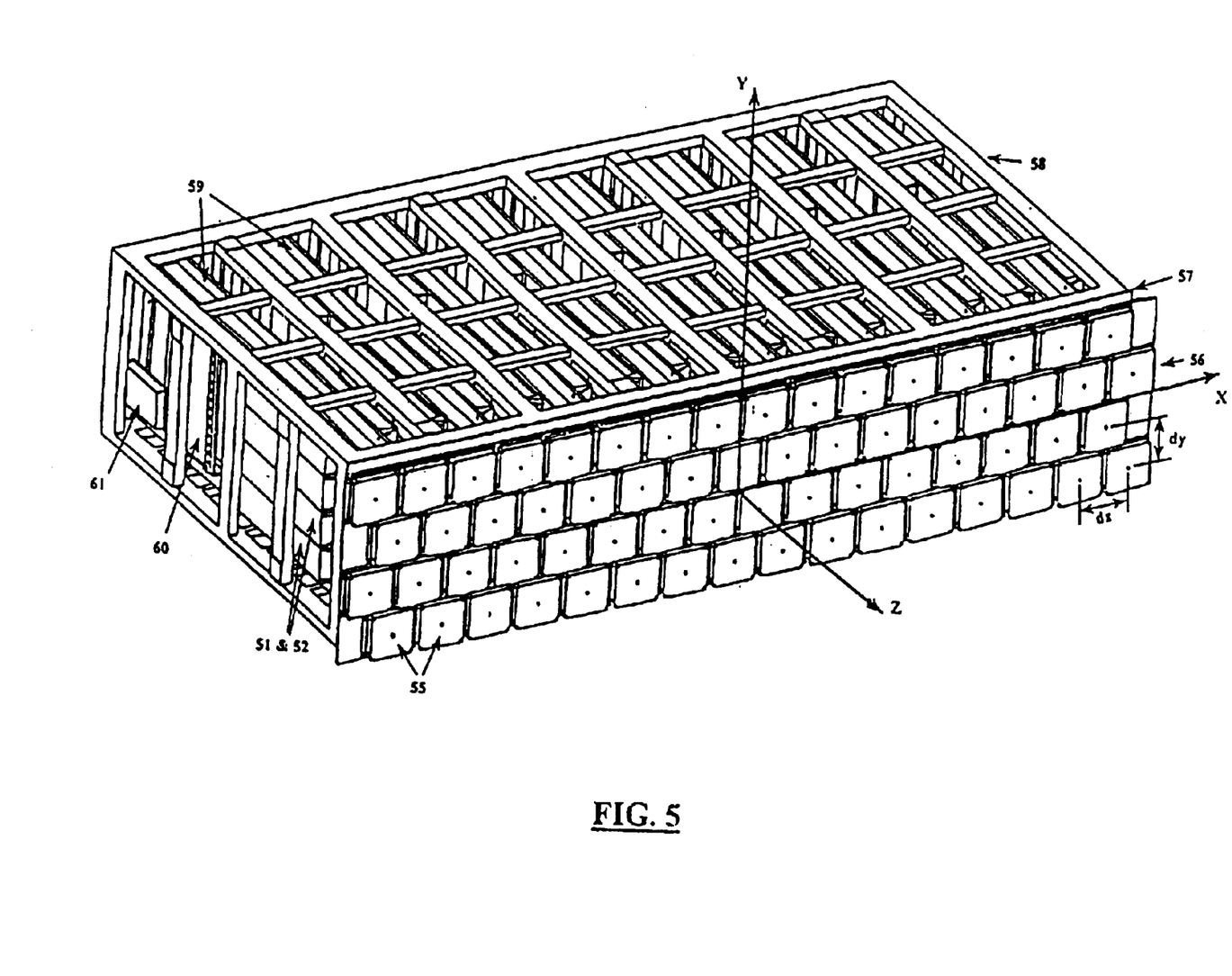
FIG. 5 is a perspective view generally illustrative of the T/R Unit consisting of 8 T/R modules and associates circuitry, being plugged into the black of a planar array of an Active Phased Array Antenna System.

Referring to FIG. 5, the triangular array lattice of the radiating elements 55, 56 mounted on the array back-up plate 57, dictate the lateral size of the T/R module. The array back-up structure 58 with LRUs (Line Replaceable Units) 59 for mounting of T/R modules and associated circuitry, is generally illustrative of a High Power Active Phased Array architecture. The T/R modules, eight in number, are shown housed in each of the LRUs 59 (also called as T/R units) with their associated component circuitry of Tx/Rx RF manifold 60, control circuitry based on microcontroller 61 in the T/R Unit level, and power supplies 62.

Figure 6:
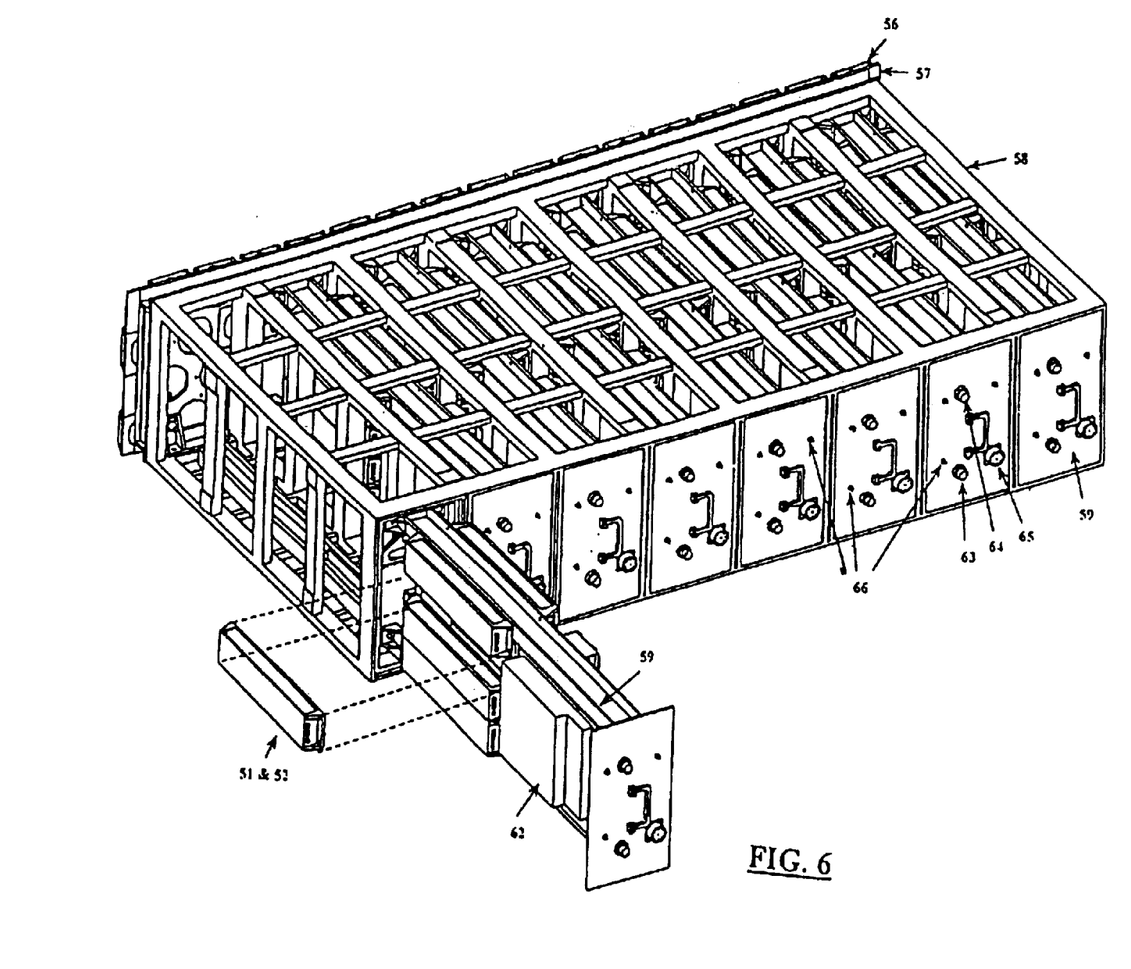
FIG. 6 is an exploded view of one T/r Unit drawn out of the Array unit of FIG. 5, illustrative of the T/R modules and associated circuitry of the particular T/R Unit.

Referring to FIG. 6, T/R Unit level cooling is through a common cold plate used for cooling of power supply units, and Coolant manifolds (In and Out) for the eight T/R modules 51 and 52 stacked four on either side of the LRU. The coolant inlet/outlet in the T/R unit level are through the snap-on connection ports 63 and 64 and the DC/Signal connections are through the connector 65. RF signal interface to the higher level of the array (viz., a group of T/R Units) will be through the RF connection ports 66. The RF cabling in the T/R unit is implemented and brought out on the array side in a coaxial snap-on connections, so that, the T/R Units could be installed or removed as LRUs for any testing or repair maintenance.

The present embodiment of the invention, which has been set forth above, was for the purpose of illustration and is not intended to limit the scope of the invention. It is to be understood that various changes, adaptations and modifications can be made in the invention described above by those skilled in the art without departing from the scope of the invention which has been defined by following claims:

We claim:

1. A transmit/receive module for a high power active phased array antenna system operating in L-band based upon a combination of hybrid microwave integrated circuit (MIC) and monolithic microwave integrated circuit (MMIC) technology and having power monitoring means (22–25) for on line diagnostic purposes, a transmitter protector means and a receiver protector means, the said transmit/receive module comprising:

signal transmit chain (10) incorporating power conditioner (38), and signal receive chain (11) incorporating control electronics (37) and bias sequencer-modulator (39);

wherein the said signal transmit chain (10) comprises of:

TP switching means (35) for switching means (35), for switching the module to the transmit mode, connected to the transmit amplifier chain (12–20) through shared 6-bit digital phase shifter (36);

duplexer means (21) receiving the amplified signal from the transmit amplifier chain (12–20) and forming the said transmitter protector means of the said transmit chain (10);

a high power switch (28) having a drop in circulator (27) connected to its input end which together with a high power limiter (29) of the said receive chain (11) form the said receiver protector means of the said receive chain (11);

on-line power monitoring means (22–25); a Single Pole Single Throw (SPST) switch (26) for on line sampling of transit power;

Tx/Rx interface PCBs (40, 41) for interconnections between the said transmit chain (10) and the said receive chain (11);

wherein, the said receive chain (11) receives signal from drop-in circulator (27) and high power switch (28) in receive mode and comprises of:

high power limiter (29);

RF pre-selection filter (30) connected to the said high power limiter (29);

low noise amplifier means (31–33);

6-bit digital attenuator means (34) connected to shared digital phase shifter (36) through T/R switching means (35);

all connected through control electronics (37), bias sequencer-modulator (39) and power conditioner means (38).

2. A transmit/receive module as claimed in claim 1, wherein, the said transmit chain power amplifier (12–20) comprises four stage class-C amplifiers (13–20), a GaAs monolithic microwave integrated circuit (MMIC) medium power amplifier driver (12) and a final power amplifier chain (17–20) which includes balanced stage amplifiers (17–18) with wire-line hybrid divider (19)/combiner (20).

3. A transmit/receive module as claimed in 1, wherein, the said power monitor means (22–25) comprises a microstrip coupler (22) and a detector (24) connected together for forward power monitoring, and an asymmetric microstrip coupler (23) and a detector (25) connected together for reverse power monitoring.

4. A transmit/receive module as claimed in claim 1, wherein, the said receiver protector (27–30) comprises a drop-in circulator (27), high power switch (28), and a limiter (29).

5. A transmit/receive module as claimed in claim 1, wherein, the said transmit chain (10) is based upon hybrid microwave integrated circuit (MIC) approach.

6. A transmit/receive module as claimed in claim 1, wherein, the said transmit chain (10) is configured using microstrip circuitry on thin soft ceramic microwave laminate with aluminum back-up.

7. A transmit/receive module as claimed in claim 1, wherein, the said receive chain (11) is based on hybrid GaAs monolithic microwave integrated circuits (MMICs).

8. A transmit/receive module as claimed in claim 1, wherein, the said receive chain (11) is configured using microstrip circuitry on thin soft ceramic microwave laminate with aluminium back-up.

9. A transmit/receive module as claimed in claim 1, wherein, the said transmit chain (10) and the said receive chain (11) are housed in the stacked two layer configuration in a compact housing (51) with top cover (52).

10. A transmit/receive module as claimed in claim 1, wherein, the said housing (51) has an integrated liquid cooled cold plate at its bottom with water inlet (53) on the one side and water outlet (54) on the other said of the housing and with micro-channels embedded underneath each of the high power devices of the said transit chain (10).

11. A transmit/receive module as claimed in claim 1, wherein, the said power conditioner (38) includes transmit power amplitude taper means.

12. A transmit/receive module as claimed in claim 1, wherein, filtering by the said RE pre-selection filter (30) is realized by a low loss microwave integrated circuit (MIC) band pass filter.

13. A transmit/receive module as claimed in claim 1, wherein, the said control electronics (37) and bias sequencer-modulator (39) are integrated as a part of the receive chain (11).

* * * * *